No. 11,869. Reissued Nov. 13, 1900.
A. LAUGHLIN & J. REULEAUX.
FURNACE.
(Application filed Feb. 17, 1899.)
2 Sheets—Sheet 1.
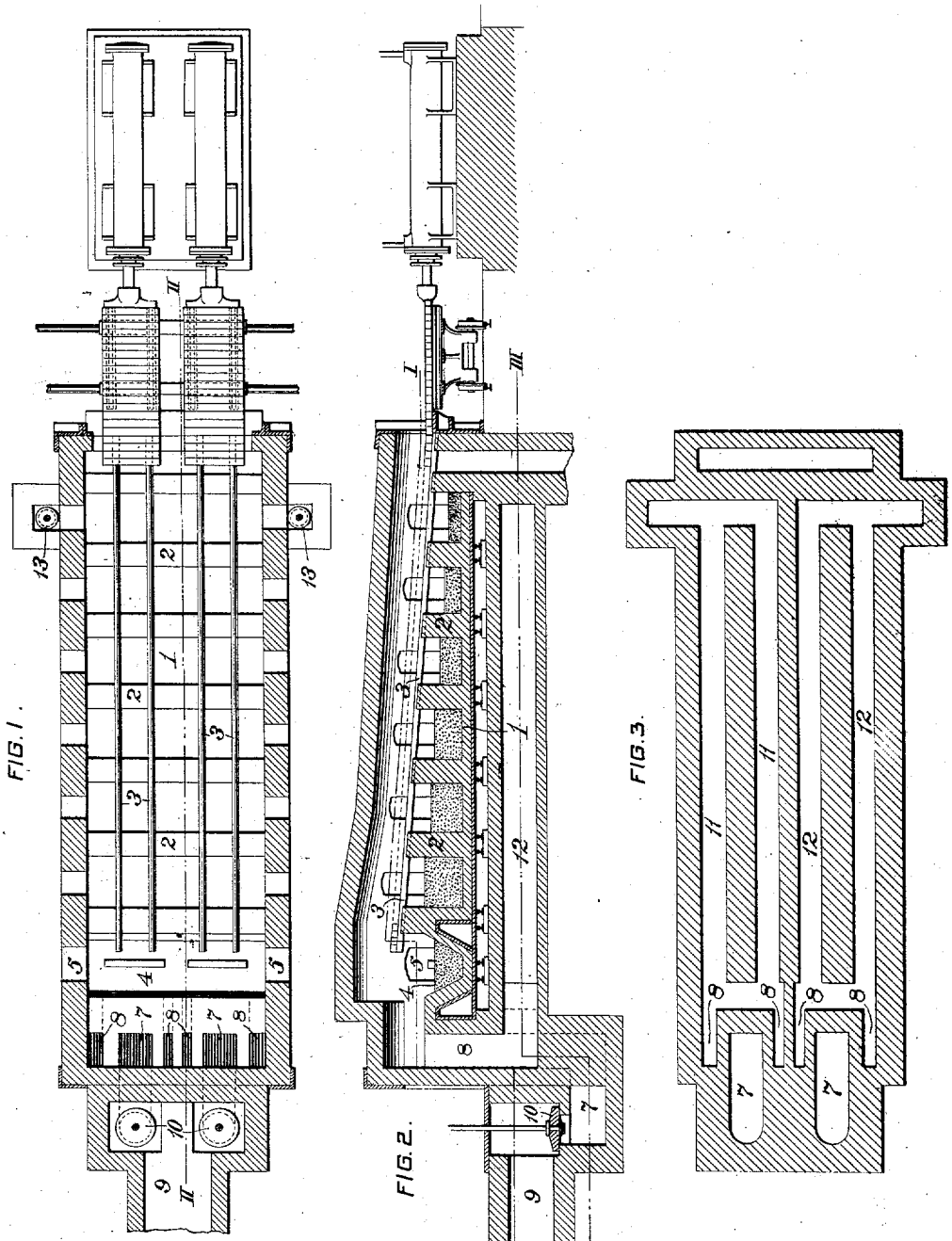
WITNESSES:
Chas. F. Miller
A. E. Gaucher
INVENTORS,
Alexander Laughlin and Josef Reuleaux
by Dennis S. Nicolett Att'y.

No. 11,869. Reissued Nov. 13, 1900.

A. LAUGHLIN & J. REULEAUX.

FURNACE.

(Application filed Feb. 17, 1899.)

2 Sheets—Sheet 2.

WITNESSES:

Chas. F. Miller.

F. E. Haisler.

INVENTORS,

Alexander Laughlin

Josef Reuleaux by Dennis S. Wolcott

Att'y.

UNITED STATES PATENT OFFICE.

ALEXANDER LAUGHLIN, OF SEWICKLEY, AND JOSEF REULEAUX, OF WILKINSBURG, PENNSYLVANIA; SAID REULEAUX ASSIGNOR TO SAID LAUGHLIN.

FURNACE.

SPECIFICATION forming part of Reissued Letters Patent No. 11,869, dated November 13, 1900.

Original No. 582,477, dated May 11, 1897. Application for reissue filed February 17, 1899. Serial No. 705,941.

*To all whom it may concern:*

Be it known that we, ALEXANDER LAUGHLIN, a resident of Sewickley, and JOSEF REULEAUX, a resident of Wilkinsburg, in the county of Allegheny and State of Pennsylvania, citizens of the United States, have invented or discovered certain new and useful Improvements in Furnaces, of which improvements the following is a specification.

The invention described herein relates to certain improvements in what are known as "continuous-heating" furnaces—*i. e.*, furnaces into which the article to be heated is charged at one end and moved through the furnaces and discharged at or near the opposite end. In the most common type of this furnace two or more vertical walls or ridges are arranged in the furnace for supporting the billet or other article during its passage, said walls terminating at their rear ends in a slope or incline leading to a receiving-bed, from which it is drawn through doors in the side walls of the furnace. Experience has shown that the slag or cinder will collect at the inclined ends of the supporting-walls in considerable quantities and either prevent the movement of the billet down the inclines to the receiving-bed or will of itself form an inclined bed from the ends of the supporting-walls over the receiving-bed to a point beyond the discharge-doors. At times this cinder and slag collects very rapidly and interferes materially with the successful operation of the furnace.

The object of the present invention is to provide a recess or pocket below and back of the discharge ends of the billet-supports for the reception of the slag and cinder, so that the latter will in no way interfere with the movement of the billets onto the receiving-bed and their removal therefrom. It is a further object of the invention to provide for the regulation of the gas and air as they flow into the furnace, thereby rendering it possible to maintain a uniformity of the heat along both sides and the middle of the furnace.

Figure 4:
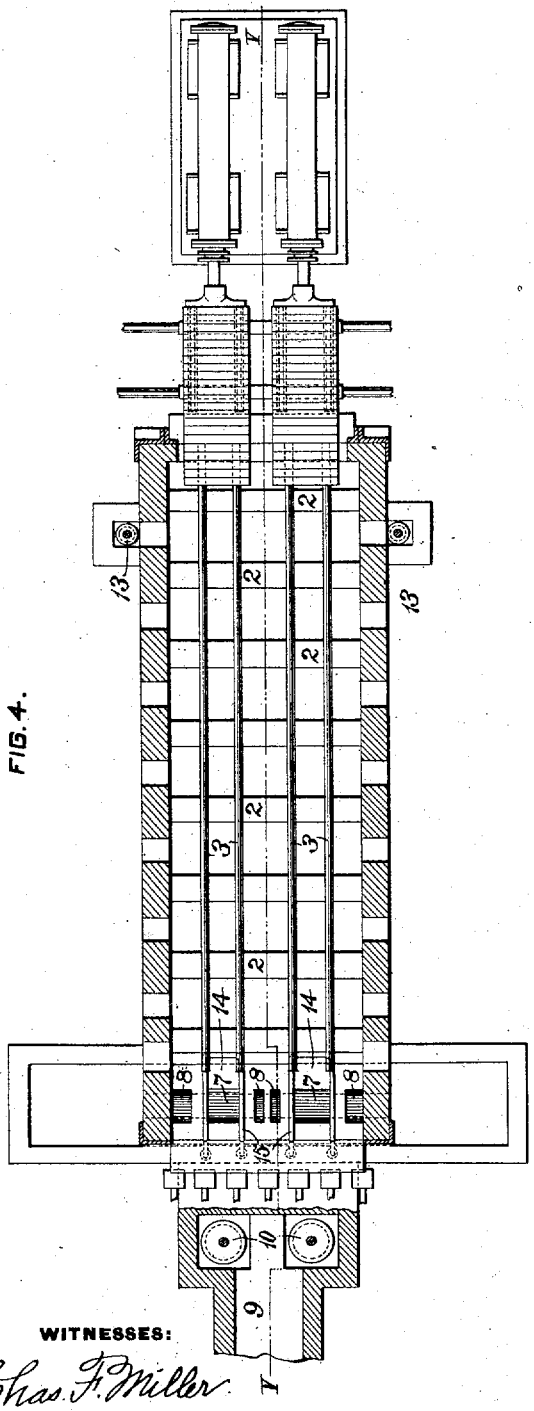
Figure 5:
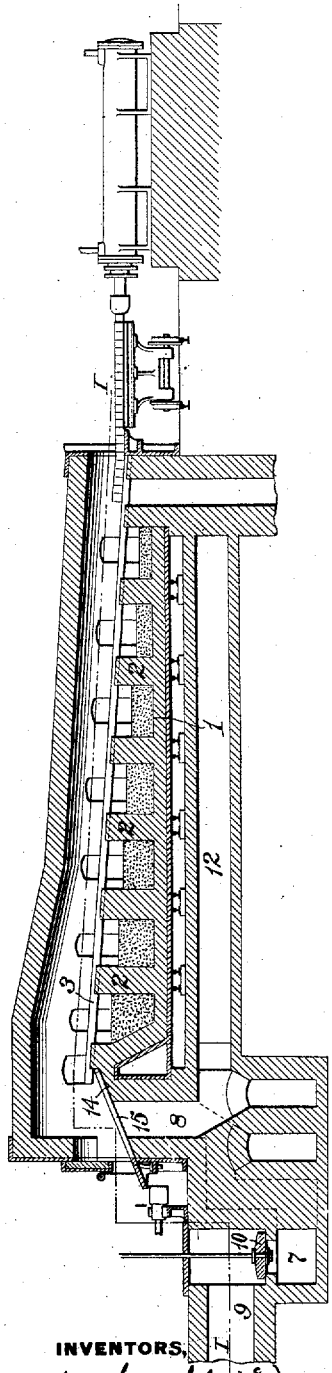

In the accompanying drawings, forming a part of this specification, Figure 1 is a sectional plan view of our improved furnace, the plane of section being indicated by the line I I, Fig. 2. Fig. 2 is a vertical section of the same, the plane of section being indicated by the line II II, Fig. 1. Fig. 3 is a sectional plan view on the plane indicated by the line III III, Fig. 2. Figs. 4 and 5 are views similar to Figs. 1 and 2, illustrating a modification of our improvement.

In the practice of our invention the furnace is constructed as regards the exterior walls and bed thereof in the usual or any suitable manner. Along the bed 1 of the heating-chamber are formed a series of transverse walls or piers 2, which serve as supports for the hollow tube or rail 3, along which the billets or other articles are caused to move in their passage through the furnace. It is preferred to form these transverse piers or walls with gradually-increasing height from the front toward the rear or discharge end of the furnace, so that the supporting tubes or rails will have a gradual upward inclination and at their rear ends will be at a considerable height above the receiving-bed 4, onto which the billets will drop from the supporting-rails. Through the side walls of the furnace, in line with the receiving-bed, are formed doors 5, through which the heated billets are drawn from the bed.

It will be observed by reference to Fig. 2 that the supporting rails or tubes project a considerable distance beyond the last supporting transverse pier or wall, so that a considerable space is provided between said wall or pier and the position which the billet will occupy on the receiving-bed for the reception of the cinder and slag. This space or pocket can be increased or diminished in accordance with the requirements of service by moving the rear supporting-walls toward or from the front end of the furnace, the length of the hollow tubes or rails being maintained constant, so that the position of their rear ends with relation to the receiving-bed and discharging-doors be substantially as shown.

Gas and air are introduced into the furnace through flues 7 and 8, arranged alternately across the furnace in the rear of the receiving-bed, the number being proportional to the width of the furnace. The gas-flues 7 are independently connected to the gas-conduit 9 at their lower ends, and the flow of gas through said flues is controlled by valves 10 of any suitable construction. The air-flues 8 are connected at their lower ends to independent passages 11 and 12 under the bed of the furnace, the air-flues on one side of the furnace being connected to the passage 11, while those on the opposite side are connected to the passage 12. Air is admitted into these passages through ports at or near the rear end of the furnace, and the flow of air through said ports is controlled by the valves 13 of any suitable construction. By reason of this construction and arrangement of flues and valves perfect control of the heating of the furnace can be obtained.

In Figs. 4 and 5 are shown our improvements applied to that class or kind of furnace described and shown in application Serial No. 615,740, filed December 15, 1896, in which provision is made for the passage of the billet or other article longitudinally through the furnace and their discharge through the rear wall of the furnace after passing over gas and air flues, as fully set forth. In order to avoid an accumulation of cinder on the receiving-bed, which in this construction is formed by the bridge-wall, supporting-rails 4 are extended at their rear ends so as to project a considerable distance above and beyond the front ends of the bridge tubes or rods 15, which carry the billets or other articles over the flues.

We claim herein as our invention—

1. A continuous-heating furnace, having in combination a billet-receiving bed located adjacent to the rear end of the furnace, and a series of two or more elevated supports extending longitudinally of the furnace from the front end thereof, the rear ends of the supports overhanging the receiving-bed, substantially as set forth.

2. A continuous-heating furnace, having in combination a billet-receiving bed located adjacent to the rear end of the furnace, a discharge-door formed through the side of the furnace in line with the receiving-bed, and a series of two or more elevated supports extending longitudinally of the furnace from the front end thereof, the rear ends of the supports overhanging the receiving-bed, substantially as set forth.

3. A continuous-heating furnace provided at or near its rear end with an opening for the removal of billets, having in combination a plurality of billet-supports extending longitudinally of the furnace from the front thereof, means for moving the billets laterally along each of said supports, a series of two or more gas-flues arranged at or near the rear end of the furnace and entering the latter at different points in proximity to the rear end of each billet-support, each flue having an independent valve connection with a gas-supply, a series of air-flues also arranged at or near the rear end of the furnace and entering the latter at different points in proximity to the rear end of each billet-support, independent valves controlling the admission of air to said flues, and outlet-flues at or near the front end of the furnace.

4. A continuous-heating furnace provided at or near its rear end with an opening for the removal of billets, having in combination a plurality of billet-supports extending longitudinally of the furnace from the front thereof, means for moving the billets laterally along each of said supports, a series of two or more gas-flues arranged at or near the rear end of the furnace and entering the latter at different points in proximity to the rear end of each billet-support, each flue having an independent valve connection with a gas-supply, a series of air-flues also arranged at or near the rear end of the furnace and entering the latter at different points in proximity to the rear end of each billet-support, independent air-inlet ports at or near the front end of the furnace, separate passages connecting said ports and air-flues, and valves in each of said ports.

In testimony whereof we have hereunto set our hands.

ALEXANDER LAUGHLIN.
JOSEF REULEAUX.

Witnesses for Laughlin:
F. E. GAITHER,
DARWIN S. WOLCOTT.

Witnesses for Reuleaux:
CLARA E. BRUNDAGE,
JOSEPHINE BISCHOF.